United States Patent [19]
Gumbert

[11] Patent Number: 5,698,257
[45] Date of Patent: Dec. 16, 1997

[54] DEVICE FOR APPLYING EXACTLY DOSED QUANTITIES OF A VISCOUS MEDIUM ON SUPPORT SURFACES AND METHOD

[75] Inventor: Hans Gumbert, Sinn, Germany

[73] Assignee: U.S. Philips Corporation, New York, N.Y.

[21] Appl. No.: 646,423

[22] Filed: May 7, 1996

[30] Foreign Application Priority Data

May 11, 1995 [DE] Germany ............... 195 17 342.2

[51] Int. Cl.⁶ .................................................. A21C 9/04
[52] U.S. Cl. .......................... 427/8; 118/712; 427/131
[58] Field of Search .................... 427/8, 207.1, 131; 118/712

[56] References Cited

FOREIGN PATENT DOCUMENTS 2-301184A 12/1990 Japan .

*Primary Examiner*—Bernard Pianalto
*Attorney, Agent, or Firm*—Arthur G. Schaier; Norman N. Spain

[57] ABSTRACT

A device for applying exactly dosed quantities of a viscous medium on support surfaces including a backing plate with an upper side and a lower side and at least one through hole, a dosing plate having at least one through hole and an upper side and a lower side which rests on the upper side of the backing plate, while it is possible to change the positions of the backing plate and the dosing plate relative to one another through shifting of the dosing plate or backing plate, an internally hollow tube whose outer wall is connected with exact fit to the whole wall of the hole of the backing plate at one end of the tube for each through hole of the backing plate, a die which can be passed through the through holes of the dosing plate and of the backing plate and through the internally hollow tube, for each through hole of the backing plate, and a wiper device operating parallel to the upper side of the dosing plate, by means of which a viscous medium can be introduced into the through hole of the dosing plate.

17 Claims, 2 Drawing Sheets

DEVICE FOR APPLYING EXACTLY DOSED QUANTITIES OF A VISCOUS MEDIUM ON SUPPORT SURFACES AND METHOD

BACKGROUND OF THE INVENTION

1. Field of the Invention

The invention relates to a device for applying exactly dosed quantities of a viscous medium on support surfaces.

2. Description of the Related Art

Such a device is known from JP 2-301184. It comprises a horizontally arranged dosing plate which has a through hole in which a die is present which is of exactly matching shape and is movable in vertical direction. The die is initially in a central position such that a hollow space is formed between the upper side of the die and the upper side of the dosing plate. The viscous medium to be dosed is present on the upper side of the dosing plate laterally of the hole. This medium is introduced into the hollow space between the upper side of the die and the upper side of the dosing plate by means of a wiper device which operates parallel to the upper side of the dosing plate. Subsequently the die is moved perpendicularly upwards, and the viscous medium is pressed against a support surface from below. Then the die is moved down again, and the viscous medium stays behind, adhering to the support surface. Such a method, however, has a few disadvantages. Dosing of the viscous medium by means of the die is possible in vertical upward direction only, so that the application possibilities of this process are strongly limited. It is thus not possible to provide exactly dosed quantities of the viscous medium on support surfaces which extend in vertical direction or on support surfaces screened off by other components. Examples of this are the application of grease points in a magnetic tape cassette appliance under manufacture. Furthermore, the dosing quantity in this method is dependent on the instantaneous viscosity of the medium. This is again dependent on the ambient temperature and relative humidity. Depending on the instantaneous viscosity of the medium, part of the medium will flow down from the upper side of the die when the latter is lifted. Similarly, the quantity of the viscous medium which will adhere to the support surface when the die is applied against this surface is dependent on the viscosity of the medium and accordingly on the ambient temperature and relative humidity. A further disadvantage is that the die dimensions are to be changed in dependence on the desired dosing quantity. The greater the desired dosing quantity, the greater the upper surface area of the die must be to achieve that the smallest possible quantity of the viscous medium will flow down from the upper side of the die when the latter is lifted.

SUMMARY OF THE INVENTION

It is an object of the invention to provide a device by means of which exactly dosed quantities of a viscous medium can be applied to support surfaces independently of the instantaneous viscosity.

The device according to the invention is characterized by a backing plate with an upper side and a lower side and comprising at least one through hole, a dosing plate comprising at least one through hole and having an upper side and a lower side, which lower side of the dosing plate rests on the upper side of the backing plate, while it is possible to change the positions of the backing plate and the dosing plate relative to one another through shifting of the dosing plate or backing plate, an internally hollow tube whose outer wall is connected through with exact fit to the hole wall of the through hole of the backing plate at one end of the tube, for each through hole of the backing plate, a die which can be passed through the through holes of the dosing plate and of the backing plate and through the internally hollow tube, for each through hole of the backing plate, a wiper device operating parallel to the upper side of the dosing plate, by means of which a viscous medium can be introduced into the through hole of the dosing plate.

First, the backing plate and the dosing plate are mutually so shifted that the hole of the backing plate and the hole of the dosing plate are not in communication. The viscous medium provided on the upper side of the dosing plate is now introduced into the hole of the dosing plate by the wiper device. The dosing quantity depends on the diameter and height of the hole and may be varied as desired through changes in these parameters. Now the dosing plate and the backing plate are so shifted relative to one another that the hole of the dosing plate filled with the viscous medium is positioned exactly over the hole of the backing plate. The internal diameter of the hole of the dosing plate corresponds to the internal diameter of the internally hollow tube which is present in the hole of the backing plate. The die is now introduced into the hole of the dosing plate and subsequently into the tube down to the tube end. As a result, the viscous medium is pressed from the tube onto the support surface. The dosing accuracy of this device according to the invention is clearly increased, especially in the case of small dosed quantities. The diameter of the tube and accordingly that of the die may be chosen to be very small. It is not necessary to change it in the case of different dosing quantities. Rather, the dosing quantity can be varied by varying the height of the hole in the dosing plate. Owing to the small diameter of the die, the quantity of viscous medium sticking to the die when the latter is retracted from the support surface is very small. Added to this there is a trickle-off effect at the edge of the tube when the die is retracted. The dosing accuracy which can be achieved with this device is of the order of approximately 1 $mm^3$. A further advantage of this device is that dosing is possible both in upward and in downward direction.

An advantageous embodiment of the device is characterized in that the tube and the die are of a flexible construction.

The flexible construction of the tube and the die renders it possible to provide the viscous medium also on vertical or oblique support surfaces. If, for example, exactly dosed quantities of lubricant are to be provided on support surfaces in an appliance under manufacture, for example a magnetic tape cassette appliance, support surfaces distributed anywhere in the appliance can be reached as desired by means of the device according to the invention.

A further advantageous embodiment of the invention is characterized in that a guide plate is provided above the dosing plate, which guide plate comprises for each die a through hole for guiding the die. The guide plate is an aid in facilitating a high degree of automation of the dosing process.

A further advantageous embodiment of the invention is characterized in that a sleeve is fastened in the through hole of the guide plate, the internal diameter of said sleeve corresponding to the diameter of the hole of the dosing plate, while an end of the sleeve bears with exact fit on the upper side of the dosing plate.

The exact fit of the sleeve on the upper side of the dosing plate prevents that a portion of the viscous medium present in the through hole can escape sideways onto the upper side of the dosing plate when the die is introduced into the hole of the dosing plate.

A further advantageous embodiment of the invention is characterized in that the die is mounted to an upper plate which is movable perpendicularly to the upper and lower sides of the dosing plate and of the backing plate. The upper plate is an aid in facilitating a high degree of automation of the dosing process. Thus it is possible in particular to fasten several dies to the upper plate which are introduced into through holes of the guide plate and the dosing plate and subsequently into tubes, all in corresponding positions, when the upper plate is moved down. The simultaneous application of exactly dosed quantities onto several support surfaces is rendered possible thereby.

A further advantageous embodiment of the device according to the invention is characterized in that the upper plate, guide plate, dosing plate, and backing plate form an assembled unit which, guided by a guide frame, is movable perpendicularly to the upper sides and lower sides of the plates.

Before the die is introduced, the assembled unit is lowered such that a tube end lies immediately above the support surface. Then the die is moved into the hole of the dosing plate and subsequently into the tube down to an end position in that the upper plate is lowered, and the viscous medium is pressed onto the support surface, during which the guide plate, the dosing plate, and the backing plate retain their positions relative to the guide frame. The assembled unit is subsequently moved up, during which the die and the upper plate initially remain in the end position. This prevents a portion of the viscous medium from being sucked back into the internally hollow tube when the die is retracted from the support surface. Only then is the die removed from the tube and the hole in the dosing plate through an upward movement of the upper plate, while the guide plate, dosing plate, and backing plate retain their positions relative to the guide frame.

The device according to the invention may preferably be used for applying an exactly dosed quantity of an adhesive on a printed circuit board for the fixation of a component, for applying an exactly dosed quantity of a soldering paste on a printed circuit board, or for applying lubricant on lubrication points of a magnetic tape cassette appliance.

DETAILED DESCRIPTION OF THE PREFERRED EMBODIMENTS

FIGS. 1 to 4 show a first embodiment of a dosing device at various moments in the dosing process. To keep the Figure clear, portions of the dosing device only are shown for the various moments.

Figure 1:
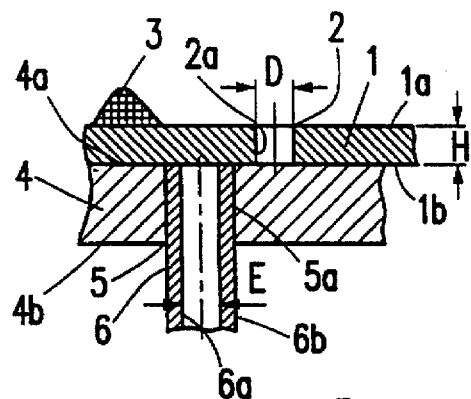
FIG. 1: a first embodiment of a partly depicted device for the exact dispensing of a viscous medium present on the upper side of a dosing plate which is movable in horizontal direction and has a through hole, while its lower side bears on a backing plate having a through hole, the hole of the dosing plate and the hole of the backing plate not being in communication.

A portion of a dosing device shown in FIG. 1 comprises a dosing plate 1 with an upper side 1a, a lower side 1b, and a plate thickness H. In the dosing plate 1, there is a circular through hole 2 with a hole diameter D and a hole wall 2a. A viscous medium 3 to be dosed is present on the upper side 1a of the dosing plate 1 laterally of the hole 2. The lower side 1b of the dosing plate 1 rests on a backing plate 4 which has an upper side 4a, a lower side 4b, and a through hole 5 with hole walls 5a. A hollow tube is fastened in the hole 5, having inner walls 6a and an internal diameter E equal to the diameter D of the hole 2 of the dosing plate 1. The dosing plate 1 is movable in horizontal direction relative to the backing plate 4. In the position of the dosing plate 1 shown in FIG. 1, this plate is so arranged that the hole 2 in the dosing plate 1 and the hole 5 in the backing plate 4 are not in communication.

Figure 2:
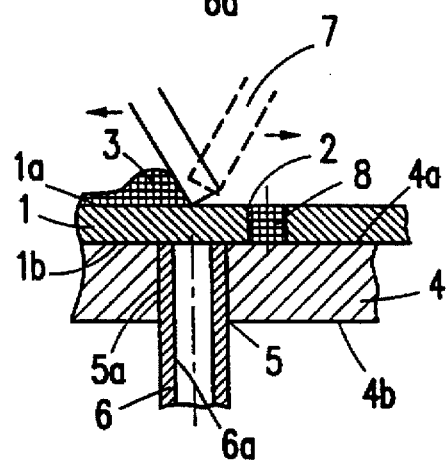
FIG. 2: the partly depicted dosing device according to FIG. 1 with a wiper device by means of which part of the viscous medium has been introduced into the hole of the dosing plate.

The position occupied by the dosing plate 1 in FIG. 1 is the same as that in FIG. 2. In addition, a wiper device 7 is indicated which operates parallel to the upper side 1a of the dosing plate 1 and by means of which a dosing quantity 8 of the medium 3 to be dosed has been introduced into the hole 2 of the dosing plate 1. The introduced dosing quantity 8 is dependent on the diameter D of the hole 2 in the dosing plate 1 and on the height H of the dosing plate 1. The dosing quantity 8 may be varied at will through variation of the diameter D of the hole 2 and/or the height H of the dosing plate 1. If the diameter D of the hole 2 is changed, however, it should be borne in mind that the internal diameter E of the tube 6 should be adapted accordingly.

Figure 3:
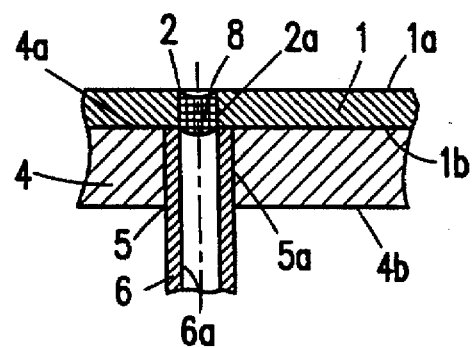
FIG. 3: the partly depicted dosing device of FIGS. 1 and 2, where the dosing plate has been shifted such that the hole in the dosing plate filled with the viscous medium is now exactly above the hole in the backing plate.

In FIG. 3, the dosing plate 1 has been shifted from the position shown in FIGS. 1 and 2 such that the hole 2 in the dosing plate 1 filled with the quantity 8 of the viscous medium 3 is now positioned exactly above the hole 5 in the backing plate 4. The inner walls 2a of the hole 2 of the dosing plate 1 now lie flush with the inner walls 6a of the tube 6 fastened in the hole 5.

Figure 4:
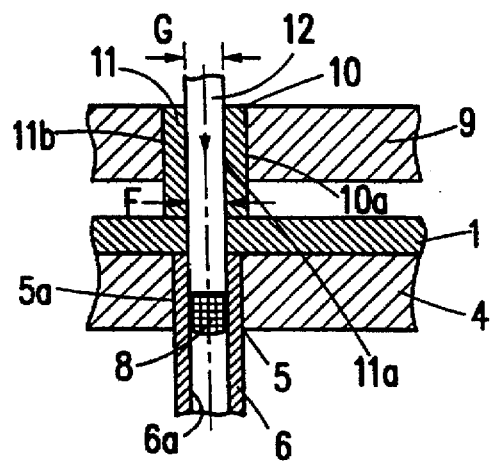
FIG. 4: the partly depicted dosing device of FIGS. 1 to 3, with a guide plate arranged above the dosing plate and having a through hole in which a sleeve is fastened, which sleeve is present exactly above the through hole in the dosing plate.

In FIG. 4, the dosing plate 1 occupies the position relative to the backing plate 4 as shown in FIG. 3. In addition, a guide plate 9 having a through hole 10 with hole walls 10a is now arranged above the dosing plate. An internally hollow sleeve 11 having an inner wall 11a and an outer wall 11b is fastened in the hole 10 of the guide plate 9. The internal diameter F of the sleeve 11 corresponds to the diameter D of the hole 2 in the dosing plate 1 and to the internal diameter E of the tube 6. The guide plate 9 with the sleeve 11 is so arranged that the inner wall 11a of the sleeve 11, the hole wall 2a of the hole 2 of the dosing plate 1, and the inner wall 6a of the tube 6 lie flush. A die 12 has been inserted into the sleeve 11, the hole 2, and the tube 6. The external diameter G of this die 12 corresponds to the internal diameter F of the sleeve 11, the diameter D of the hole 2, and the internal diameter E of the tube 6. The dosing quantity 8 of the viscous medium 3 can be pressed from the hole 2 in the dosing plate 1 first into the tube 6 and then from the tube 6 by means of this die 12. In FIG. 4, the die 12 has been introduced into the tube 6 only so far that the dosing quantity 8 is still inside the tube 6.

Figure 5:
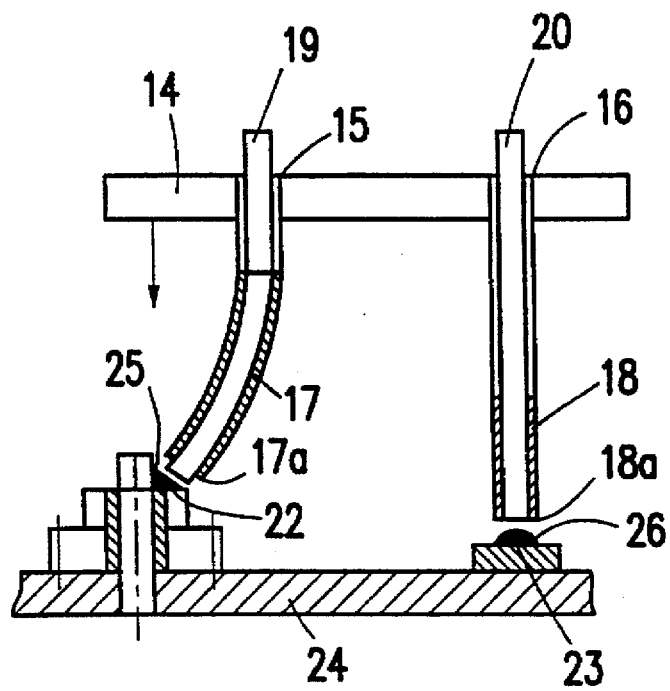
FIG. 5: a second embodiment of a dosing device, depicted only partly, which comprises two flexible tubes by means of which the medium to be dosed is applied simultaneously to support surfaces which are spaced part from one another and which are present, for example, in a magnetic tape cassette appliance.

FIG. 5 partly shows a further embodiment of a dosing device which comprises a backing plate 14 in which two through holes 15 and 16 are present. Two flexible tubes 17 and 18 are fastened in these holes 15 and 16, in which tubes two dies 19 and 20 are present which are also flexible and which are movable in the tubes 17 and 18. The tube ends 17a, 18a of the flexible tubes 17, 18 are present immediately above support surfaces 22, 23 of an appliance 24. The support surfaces 22, 23 may be, for example, surfaces to be lubricated in a magnetic tape cassette appliance or soldering pads on a printed circuit board. Dosing quantities 25 and 26 of a viscous medium have been dispensed from the tubes 17 and 18 onto the support surfaces 22 and 23 by means of the dies 19 and 20.

Figure 6:
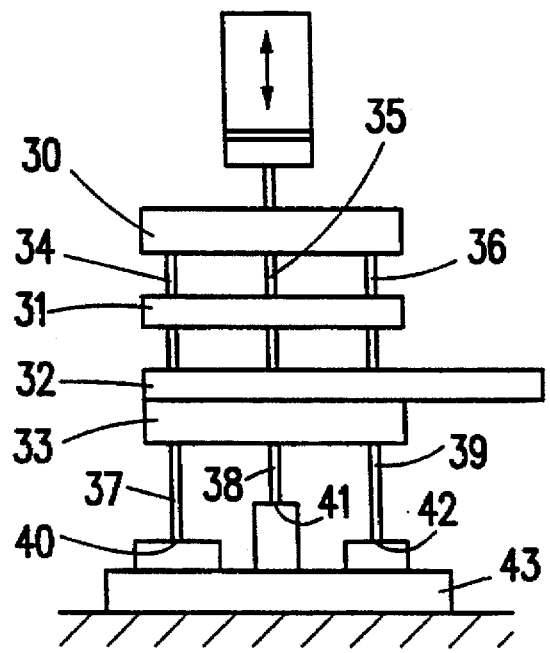
FIG. 6: a functional representation of the dosing device according to the invention with an upper plate, a guide plate, a dosing plate, and a backing plate together forming an assembled unit which can be moved up and down, the dosing device having three tubes by means of which the medium to be dosed can be applied simultaneously to three support surfaces which are mutually spaced apart.

FIG. 6 shows the operating principle of a dosing device which renders possible an automation of the dosing process. It comprises an upper plate 30, a guide plate 31, a dosing plate 32, and a backing plate 33. Three dies 34, 35, 36 are fastened to the upper plate 30. A dosing quantity (not shown) of a viscous medium is to be pressed onto support surfaces 40, 41, 42 of an appliance 43 from tubes 37, 38, 39 by means of these dies 34, 35, 36. The tubes 37, 38, 39 are present in through holes (not shown) of the backing plate 33. Initially, the upper plate 30, the guide plate 31, the dosing plate 32 and the backing plate 33 are mechanically locked to one another. Then these four plates 30, 31, 32, 33 are jointly moved down into a position in which the tubes 37, 38, 39 lie directly above the support surfaces 40, 41, 42. This position is shown in FIG. 6. Then the locking of the upper plate 30 is released, and this plate alone is moved down, while the support plate 31, the dosing plate 32, and the backing plate 33 retain their positions. As a result, the dies 34, 35, 36 are moved into the tubes 37, 38, 39, and the desired dosing quantity of the viscous medium is pressed from the tubes 37, 38, 39 onto the support surfaces 40, 41, 42. Now the upper plate 30 is locked to the other three plates 31, 32, 33 again and all four plates 30, 31, 32, 33 are jointly moved up. The tubes 37, 38, 39 are removed from the support surfaces 40, 41, 42 thereby, the dies 34, 35, 36 retaining their positions relative to the tubes 37, 38, 39. Then the locking of the upper plate 30 is released, and this plate alone is moved up, while the guide plate 31, dosing plate 32, and backing plate 33 retain their positions. The dies 34, 35, 36 are pulled from the tubes 37, 38, 39 thereby. Sucking back of the viscous medium from the support surfaces 40, 41, 42 into the tubes 37, 38, 39 is prevented by this procedure, which sucking back could occur if the dies 34, 35, 36 were moved up while the tubes 37, 38, 39 are still above the support surfaces 40, 41, 42.

I claim:

1. A device for applying exactly dosed quantities of a viscous medium to support surfaces, said device comprising:
    a backing plate with an upper side and a lower side and comprising at least one through hole,
    a dosing plate comprising at least one through hole and having an upper side and a lower side, which lower side of the dosing plate rests on the upper side of the backing plate, the positions of the backing plate and the dosing plate being changeable relative to one another through shifting of the dosing plate or of the backing plate, a hollow tube whose outer wall is connected with exact fit to the hole wall of the hole of the backing plate at one end of the tube,
    a viscous medium applied on the upper side of the dosing plate,
    a wiper device operating parallel to the upper side of the dosing plate, by means of which a viscous medium can be introduced into the through hole of the dosing plate.
    and a die which can be passed through the through holes of the dosing plate and the backing plate and through the hollow tube connected to the hole wall of the hole of the backing plate, for pressing said viscous medium through said holes of said closing plate and backing plate and through said hollow tube and onto said support surfaces.

2. A device as claimed in claim 1, wherein the tube (6; 17, 18; 37, 38, 39) is of a flexible construction.

3. A device as claimed in claim 2, characterized in that a guide plate is provided above the dosing plate, which guide plate comprises for each die a through hole for guiding the die.

4. A device as claimed in claim 2, wherein the die is mounted to an upper plate which is movable perpendicularly to the upper and lower sides of the dosing plate and of the backing plate.

5. A device as claimed in claim 1, wherein the die is mounted to an upper plate which is movable perpendicularly to the upper and lower sides of the dosing plate and of the backing plate.

6. A device as claimed in claim 1, wherein the upper plate, guide plate dosing plate, and backing plate form an assembled unit which, guided by a guide frame, is movable perpendicularly to the upper sides and lower sides of the plates.

7. A device as claimed in claim 1 wherein a guide plate is provided above the dosing plate, which guide plate comprises for each die a through hole for guiding the die.

8. A device as claimed in claim 7 wherein a sleeve is fastened in the through hole of the guide plate, the internal diameter of said sleeve corresponding to the diameter of the hole of the dosing plate, while an end of the sleeve bears and exactly fits on the upper side of the dosing plate.

9. A device as claimed in claim 8, wherein the die is mounted to an upper plate which is movable perpendicularly to the upper and lower sides of the dosing plate and of the backing plate.

10. A device as claimed in claim 7, wherein the die is mounted to an upper plate which is movable perpendicularly to the upper and lower sides of the dosing plate and of the backing plate.

11. A method of applying exactly dosed quantities of a viscous medium to a support surface comprising;
    providing a backing plate comprising at least one through hole and having an upper side and a lower side,
    positioning the lower side of a dosing plate comprising at least one through hole and an upper side and a lower side on the upper side of the backing plate,
    connecting, with exact fit, the outer wall of a hollow tube to the hole wall of the at least one through hole of said backing plate, said tube extending through the lower side of said backing plate but not through the upper side of said backing plate,
    shifting the dosing plate and the backing plate relative to each other so that so that there is no communication between the at least on through hole of the dosing plate and the at least one through hole of the backing plate, providing a quantity of said viscous medium on the upper side of the dosing plate, operating a wiper device along the upper side of the dosing plate so as to introduce said viscous medium into the at least one through hole of said dosing plate and completely fill the at least one through hole of said dosing plate with said viscous medium, mutually shifting the dosing plate and the backing plate relative to each other in a manner so that the at least one through hole of the dosing plate is positioned exactly above the at least one through hole of the backing plate, positioning the resultant assembly to contact the support surface with an end of the tube away from the dosing plate and inserting a die into said at least one through hole of the dosing plate and of the backing plate and subsequently into said tube so as to force all of the viscous medium introduced into the at least one through hole of said dosing plate on to the support surface.

12. The method as claimed in claim 11, including the step of applying lubricant to lubrication points of a magnetic tape cassette appliance.

13. A method as claimed in claim 11, wherein the die is guided by the through holes of the guide plate during its insertion into the through holes of the dosing plate and of the backing plate and during its insertion into the tube.

14. A method as claimed in claim 13 wherein the assembled unit is lowered before the insertion of the die such that an end of each tube will be present above the relevant support surface, in that then the die is inserted into the through holes of the dosing plate and the backing plate and subsequently into the tube up to an end position and presses the viscous medium onto the support surfaces, and in that then the assembled unit is lifted with the die in the end position.

15. A method as claimed in claim 11 wherein the assembled unit is lowered before the insertion of the die such that an end of each tube will be present above the relevant support surface, in that then the die is inserted into the through holes of the dosing plate and the backing plate and subsequently into the tube up to an end position and presses the viscous medium onto the support surfaces, and in that then the assembled unit is lifted with the die in the end position.

16. The method as claimed in claim 11, including the step of applying an exactly dosed quantity of an adhesive paste to a printed circuit board for fixing a component.

17. The method as claimed in claim 11, including the step of applying an exactly dosed quantity of a soldering paste to a printed circuit board.

* * * * *